US010666698B1

(12) United States Patent
Joliveau et al.

(10) Patent No.: US 10,666,698 B1
(45) Date of Patent: May 26, 2020

(54) BIT RATE SELECTION FOR STREAMING MEDIA

(71) Applicant: Amazon Technologies, Inc., Seattle, WA (US)

(72) Inventors: Marc Joliveau, Seattle, WA (US); Justin Michael Binns, Auburn, WA (US); Matthew James Bordenet, Sammamish, WA (US); Patrik Schnell, Issaquah, WA (US); Charles Benjamin Franklin Waggoner, Portland, OR (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 20 days.

(21) Appl. No.: 14/577,096

(22) Filed: Dec. 19, 2014

(51) Int. Cl.
  *G06F 16/16* (2019.01)
  *H04L 29/06* (2006.01)
(52) U.S. Cl.
  CPC .................. *H04L 65/4084* (2013.01)
(58) Field of Classification Search
  CPC ............ H04L 65/4084; H04L 67/1091; H04L 67/1061; H04L 67/104; H04L 47/38; H04L 47/30; H04N 19/152
  USPC ........................................................ 709/231
  See application file for complete search history.

(56) References Cited

U.S. PATENT DOCUMENTS

| | | | |
|---|---|---|---|
| 9,462,021 B2 | 10/2016 | Ramamurthy et al. | |
| 9,613,042 B1* | 4/2017 | Joseph | G06F 16/16 |
| 2010/0333148 A1* | 12/2010 | Musha | H04N 21/23406 725/81 |
| 2012/0311126 A1* | 12/2012 | Jadallah | H04L 41/5067 709/224 |
| 2012/0324123 A1* | 12/2012 | Fox | G06F 15/781 709/231 |
| 2013/0007263 A1* | 1/2013 | Soroushian | H04L 47/12 709/224 |
| 2013/0091251 A1 | 4/2013 | Walker et al. | |
| 2013/0097309 A1* | 4/2013 | Ma | H04L 29/08099 709/224 |
| 2013/0103849 A1 | 4/2013 | Gillies et al. | |
| 2013/0332623 A1* | 12/2013 | Gahm | H04L 65/4092 709/234 |
| 2014/0019635 A1 | 1/2014 | Reznik et al. | |
| 2014/0089469 A1 | 3/2014 | Ramamurthy et al. | |
| 2014/0089993 A1 | 3/2014 | Huysegems et al. | |
| 2014/0215085 A1 | 7/2014 | Li et al. | |
| 2014/0280760 A1* | 9/2014 | Hurst | H04L 65/60 709/219 |
| 2014/0317241 A1* | 10/2014 | Zhao | H04L 65/608 709/219 |

(Continued)

OTHER PUBLICATIONS

Co-pending U.S. Appl. No. 14/577,153, filed Dec. 19, 2014.*

(Continued)

*Primary Examiner* — Tan Doan
(74) *Attorney, Agent, or Firm* — Thomas | Horstemeyer, LLP

(57) ABSTRACT

Disclosed are various embodiments for a service for selecting the bandwidth of a media stream. The service correlates the buffer state of a client with previously communicated portions of the stream. The service then determines a bit rate for subsequent portions of the stream. A manifest may be generated indicating a source for content at the determined bit rate.

19 Claims, 6 Drawing Sheets

(56) References Cited

U.S. PATENT DOCUMENTS

| | | | | |
|---|---|---|---|---|
| 2014/0337411 | A1* | 11/2014 | Panje | H04L 65/60 709/203 |
| 2015/0319066 | A1 | 11/2015 | Lida et al. | |
| 2015/0381690 | A1 | 12/2015 | Schmidt et al. | |

OTHER PUBLICATIONS

U.S. Appl. No. 14/577,087, filed Dec. 19, 2014, Non-Final Office Action dated Oct. 6, 2016.

Draxler et al., "Anticipatory Buffer Control and Quality Selection for Wireless Video Streaming," arXiv: 1309.5941v2 [cs. NI] Aug. 22, 2014.

U.S. Appl. No. 14/577,087, filed Dec. 19, 2014, Notice of Allowance dated Feb. 13, 2017.

U.S. Appl. No. 14/577,087, filed Dec. 19, 2014, Response to Non-Final Office Action filed on Dec. 19, 2016.

U.S. Appl. No. 14/577,153, filed Dec. 19, 2014, Response to Restriction/Election filed on Dec. 19, 2016.

U.S. Appl. No. 14/577,153, filed Dec. 19, 2014, Final Office Action dated Aug. 29, 2017.

U.S. Appl. No. 14/577,153, filed Dec. 19, 2014, Response to Non-Final Office Action dated Mar. 9, 2017.

U.S. Appl. No. 14/577,153, filed Dec. 19, 2014, Non-Final Office Action dated Mar. 9, 2017.

U.S. Appl. No. 14/577,153, filed Dec. 19, 2014, Restriction/Election dated Nov. 16, 2016.

U.S. Appl. No. 14/577,153, filed Dec. 19, 2014, Non-Final Office Action dated Apr. 2, 2018.

U.S. Appl. No. 14/577,153, filed Dec. 19, 2014, Response to Final Office Action dated Aug. 29, 2017.

U.S. Appl. No. 15/602,261, filed May 23, 2017, Response to Non-Final Office Action dated Oct. 6, 2017.

U.S. Appl. No. 15/602,261, filed May 23, 2017, Non-Final Office Action dated Oct. 6, 2017.

U.S. Appl. No. 15/602,261, filed May 23, 2017, Notice of Allowance dated Feb. 14, 2018.

U.S. Appl. No. 14/577,153, filed Dec. 19, 2014, Final Office Action dated Oct. 2, 2018.

U.S. Appl. No. 14/577,153, filed Dec. 19, 2014, Non-Final Office Action dated Apr. 19, 2019.

U.S. Appl. No. 15/968,998, filed May 2, 2018, Non-Final Office Action dated Jun. 14, 2019.

U.S. Appl. No. 14/577,153, filed Dec. 19, 2014, Final Office Action dated Sep. 20, 2019.

U.S. Appl. No. 15/968,998, filed May 2, 2018, Notice of Allowance dated Nov. 22, 2019.

U.S. Appl. No. 14/577,153, filed Dec. 19, 2014, Notice of Allowance dated Mar. 9, 2020.

* cited by examiner

BIT RATE SELECTION FOR STREAMING MEDIA

BACKGROUND

Clients may stream media over a network. Such media may include video, audio, or other data. Network conditions may change during the stream of media to the client.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Figure 1:
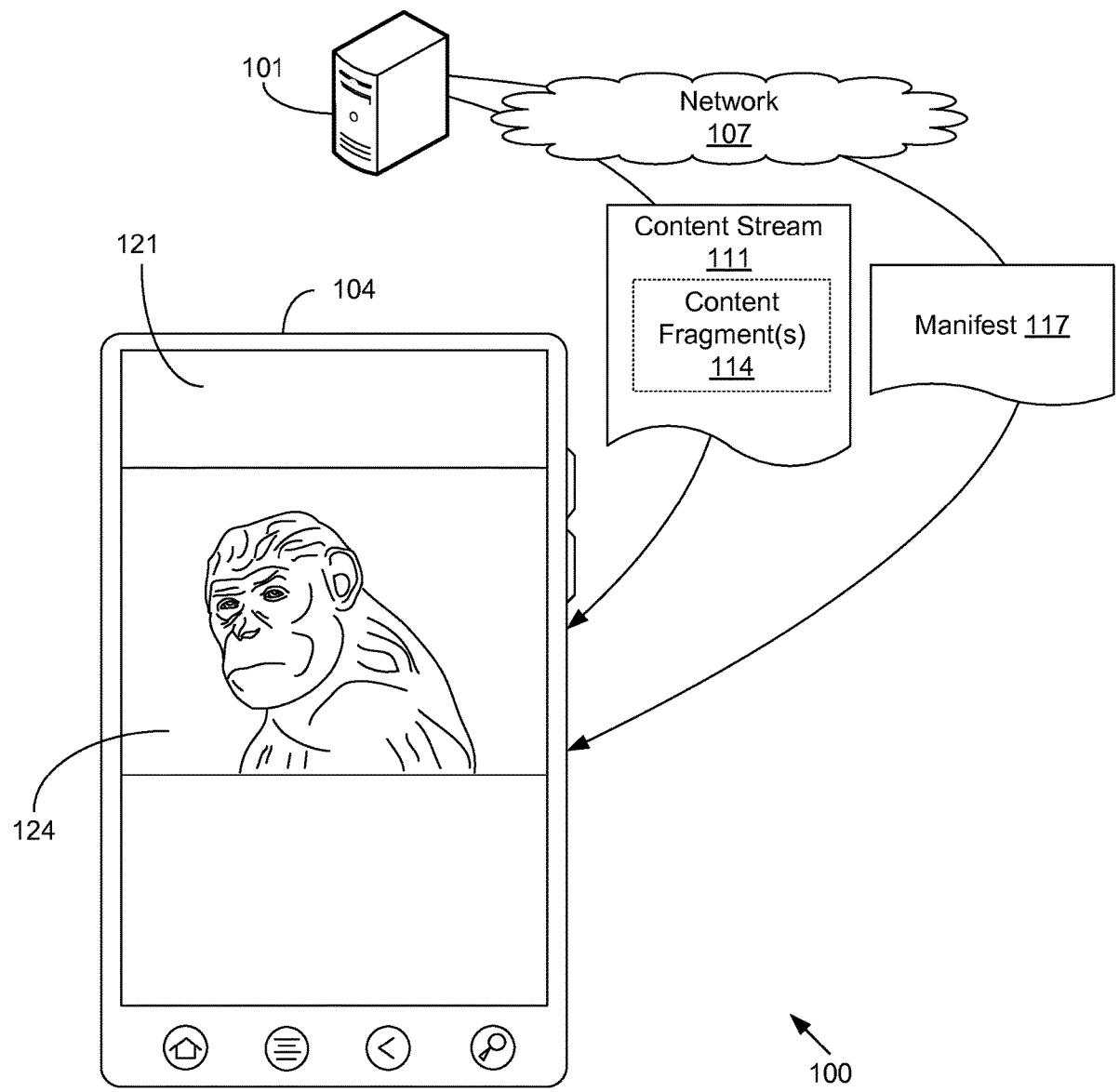
FIG. 1 is a pictorial representation of an example scenario according to various embodiments of the present disclosure.

Media distribution services facilitating streams of media may access content encoded in varying bit rates in order to adapt to changes in network conditions. For example, a live media stream may include a media feed provided to multiple encoders, each encoding the media feed into a different bit rate. As another example, a fully stored, or "on demand" media item may be divided into many portions. These portions may be segments of time, location, or other units. Each of these segments of time may then each be encoded into fragments of differing bit rates, resolutions, or other attributes. As network conditions change, a client would request a sequentially next fragment of the stream that is suitable for the current network conditions.

For a media distribution service distributing a live stream of content, the media distribution service may repeatedly communicate manifests to a client throughout the duration of the live stream. The manifests indicate currently available sources for streaming data, and corresponding metadata. The client then selects a source from the manifest to request a sequentially next portion of the live stream. The manifest file would include Uniform Resource Locators (URLs), network addresses, or other source identifiers from which the client may request portions of the stream at a corresponding bit rate. For media distribution service distributing media on demand, the versions available for a given media item may be indicated in a manifest file communicated to the client at the beginning of the stream. The client determines, based on current network conditions, which sequentially next fragment of the stream should be requested, and then communicates a request to the source indicated in the manifest. Under this approach, as the client decides the appropriate fragment to request, the media distribution service cannot control which fragments the client will request.

In some embodiments, a manifest generation service estimates the bandwidth available to the client during a stream of on demand content. This may be performed using bandwidth updates communicated by the client, performed by accessing the state of a buffer of the client, or performed by another approach. The manifest generation service then determines, from the available fragments for the streaming media item, a sequentially next fragment of the stream to be communicated to the client. A manifest is then generated indicating the determined fragment and corresponding source identifier, but excluding source identifiers for other fragments that may be available for the corresponding segment of the media item. As the client receives a manifest indicating only one fragment, it must request the indicated fragment. The manifest generation service repeatedly generates a manifest according to this approach so that the client is requesting stream data as determined by the manifest generation service.

In other embodiments, a client application may be configured to determine an estimated bandwidth and estimated latency to a media distribution service. Using the estimated bandwidth, estimated latency, and a state of a buffer of the client, the client application determines a fragment to be requested next. The estimated latency may also be used to determine when a request should be sent, so that a sequentially next fragment of the steam begins downloading close to the conclusion of a download of a currently downloading fragment of the stream.

In the following discussion, a general description of the system and its components is provided, followed by a discussion of the operation of the same.

With reference to FIG. 1, shown is an example scenario of a stream of video content according to various embodiments of the present disclosure. Server 101 facilitates the operation of a media distribution service that communicates on demand media content to a client 104 via a network 107. The server 101 communicates the on demand content as a content stream 111 of content fragments 114 to the client 104. The content fragments 114 are portions or subdivisions of a media item as requested by the client 104, and may be known as "chunks" or "blocks" of a stream. The server 101 also communicates a manifest 117 indicating URLs or other identifying data from which content fragments 114 may be requested. Although the discussion below may discuss the data identifying network locations to which requests are sent as URLs, it is understood that other identifying data may also be used. The server 101 may be configured to repeatedly communicate manifests 117 to the client 104 indicating a single source of content fragments 114, thereby limiting the choice of bit rate by the client 104 to the single source. As content fragments 114 are downloaded by the client 104 via the network 107, the client 104 renders the data encoded in the content fragments 114 on the display 121, thereby generating the image 124.

Figure 2:
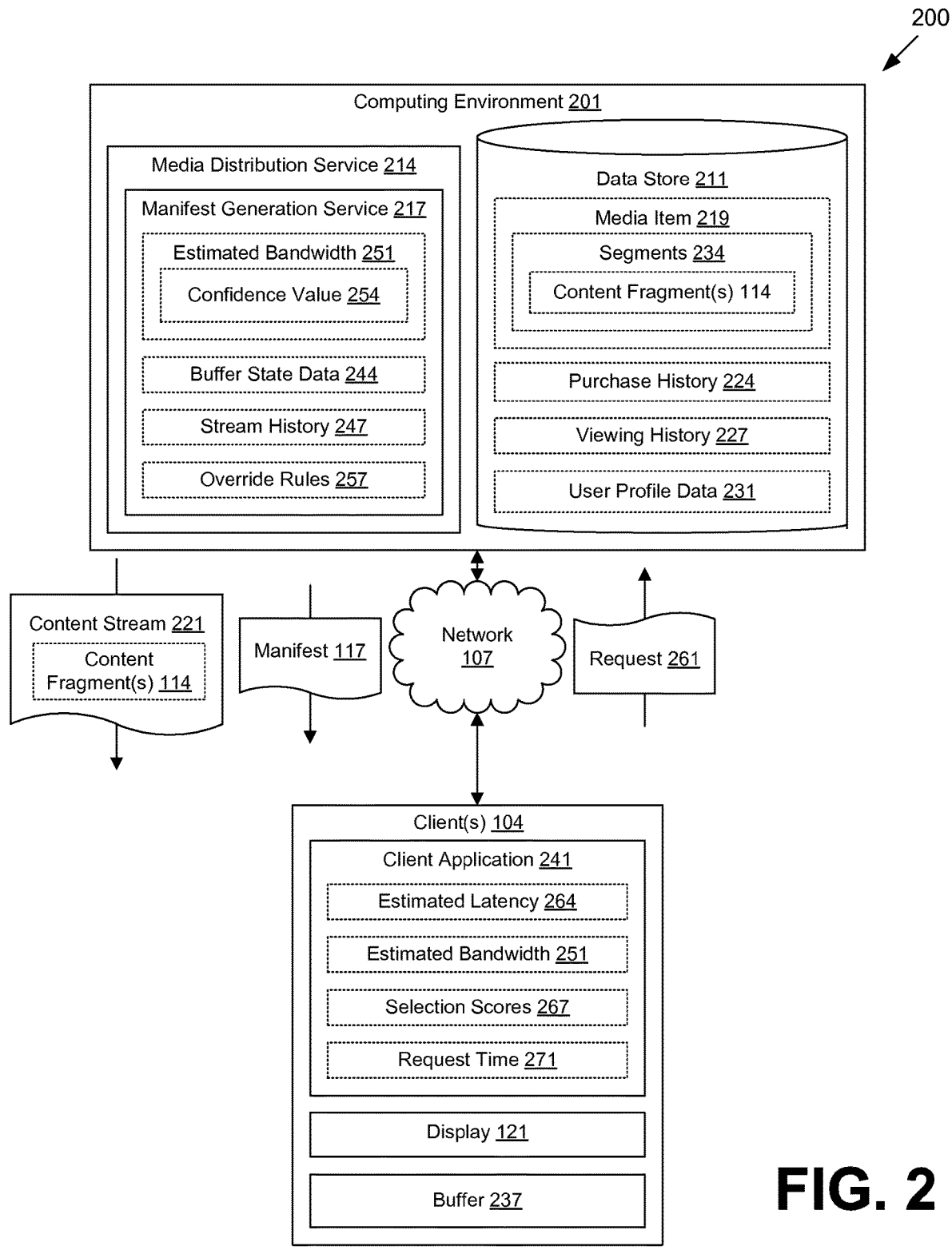
FIG. 2 is a drawing of a networked environment according to various embodiments of the present disclosure.

Turning now to FIG. 2, shown is a networked environment 200 according to various embodiments. The networked environment 200 includes a computing environment 201 and a client 104 (FIG. 1), which are in data communication with each other via a network 107 (FIG. 1). The network 107 includes, for example, the Internet, intranets, extranets, wide area networks (WANs), local area networks (LANs), wired networks, wireless networks, or other suitable networks, etc., or any combination of two or more such networks. For example, such networks may comprise satellite networks, cable networks, Ethernet networks, and other types of networks.

The computing environment 201 may comprise, for example, a server 101 (FIG. 1) computer or any other system providing computing capability. Alternatively, the computing environment 201 may employ a plurality of computing devices that may be arranged, for example, in one or more server banks or computer banks or other arrangements. Such computing devices may be located in a single installation or may be distributed among many different geographical locations. For example, the computing environment 201 may include a plurality of computing devices that together may comprise a hosted computing resource, a grid computing resource and/or any other distributed computing arrangement. In some cases, the computing environment 201 may correspond to an elastic computing resource where the allotted capacity of processing, network, storage, or other computing-related resources may vary over time.

Various applications and/or other functionality may be executed in the computing environment 201 according to various embodiments. Also, various data is stored in a data store 211 that is accessible to the computing environment 201. The data store 211 may be representative of a plurality of data stores 211 as can be appreciated. The data stored in the data store 211, for example, is associated with the operation of the various applications and/or functional entities as described below.

The components executed on the computing environment 201, for example, include a media distribution service 214 having a manifest generation service 217, and other applications, services, processes, systems, engines, or functionality not discussed in detail herein. The media distribution service 214 is executed to facilitate the streaming of a media item 219 to a client 104. To this end, the media distribution service 214 serves as an origin of a content stream 221 of periodically communicated content fragments 114 of the media item 219 to the client 104. The media distribution service 214 may be configured to implement the content stream 221 as an on demand stream of a media item 219, a live stream of a data feed, or by another approach. The manifest generation service 217 is configured to generate and communicate manifests 117 for a currently streaming media item 219 to the client 104. Manifests 117 may be pushed to a client 104, communicated in response to a request for a manifest 117 by the client 104, or otherwise communicated to the client 104.

The data stored in the data store 211 includes, for example, media items 219, a purchase history 224, a viewing history 227, user profile data 231 and potentially other data. Media items 219 include audio items, video items, audio-video items, still images, and other media that may be streamed to the client 104 via the media distribution service 214. Media items 219 may be divided into segments 234, each segment 234 corresponding to a portion of time of the media item 219. For a given segment 234, a media item 219 may have multiple corresponding content fragments 114. To this end, each of the content fragments 114 for a particular segment 234 would embody the same portion of time of the media item 219, but encoded according to different versions. For example, each the content fragments 114 for a particular segment 234 of a media item 219 may be encoded into multiple versions, differing in bit rate, resolution, data size, encoding scheme, language, subtitle track, visual or audio components, or having other differences. The content fragments 114 would be encoded to be aligned according to the segments 234, such that each content fragment 114 at a given segment 234 would correspond to similar time codes, frames, or other portions of the media item 219. This allows the media distribution service 214 to vary the bit rate, language, or other attribute of the content stream 221 while maintaining smooth playback by the client 104.

The purchase history 224 indicates media items 219 previously purchased, rented, downloaded, or otherwise obtained by a client 104 or in associated with a user account. The purchase history 224 may also indicate items, products, or services purchased or otherwise acquired via an electronic commerce system. The viewing history 227 indicates viewing or other behavioral data with respect to a consumption of a media item 219. For example, a viewing history 227 may indicate rewind, fast-forward, chapter selection, chapter skipping, or other playback modifications performed in association with a consumption of a media item 219 by a client 104. User profile data 231 indicates various attributes of a defined user of the media distribution service 214, including location data, demographic data, playback preferences, censorship or content restriction preferences, or other data.

The client 104 is representative of a plurality of client devices that may be coupled to the network 107. The client 104 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, or other devices with like capability. The client 104 may include a display 121. The display 121 may comprise, for example, one or more devices such as liquid crystal display (LCD) displays, gas plasma-based flat panel displays, organic light emitting diode (OLED) displays, electrophoretic ink (E ink) displays, LCD projectors, or other types of display devices, etc. The client 104 may further implement a buffer 237 into which content fragments 114, subsets of content fragments 114, or other data of a content stream 221 may be stored before rendering.

The client 104 may be configured to execute various applications such as a client application 241 and/or other applications. The client application 241 may be executed in a client 104, for example, to access network content served up by the computing environment 201 and/or other servers, thereby rendering a user interface on the display 121. To this end, the client application 241 may comprise, for example, a browser, a dedicated application, etc., and the user interface may comprise a network page, an application screen, etc. The client 104 may be configured to execute applications beyond the client application 241 such as, for example, email applications, social networking applications, word processors, spreadsheets, and/or other applications.

Next, a general description of the operation of the various components of the networked environment 200 is provided. To begin, in some embodiments, a client 104 requests the media distribution service 214 to begin an on demand content stream 221 of a media item 219. Instead of communicating a single manifest 117 at the beginning of the on demand content stream 221 that indicates each of the available bit rates or other versions of a media item 219, the manifest generation service 217 monitors the state of the client 104 and current network 107 conditions. The manifest generation service 217 then communicates an updated manifest 117 to the client 104 indicating a single URL directed to a sequentially next content fragment 114 as determined by the manifest generation service 217, as will be discussed below. A sequentially next content fragment 114 may include a content fragment 114 at a next segment 234 with respect to a last requested content fragment 114, with respect to a last communicated content fragment 114, or with respect to another content fragment 114.

To facilitate generating updated manifests 117 during the content stream 221, the manifest generation service 217 may obtain, from the client 104, buffer state data 244 indicating the state of a buffer 237 over time. The buffer state data 244 may indicate, for example, a total size of the buffer 237. The buffer state data 244 may also indicate, at a given time, an amount of data stored in the buffer 237, a duration of content stored in the buffer 237, or other data. Accordingly, viewed over time, the buffer state data 244 may indicate a rate of change in the amount of data stored in the buffer 237, a rate of change in the duration of content stored in the buffer 237, or other rates of change.

Additionally, as content fragments 114 are communicated to the client 104, the manifest generation service 217 may aggregate a stream history 247 indicating a bit rate, size, resolution, or other attribute of a respective content fragment 114 communicated to the client 104 at a given time. The manifest generation service 217 may correlate the buffer state data 244 and the stream history 247 to determine, at a given time, an effect on a buffer state data 244 when downloading a content fragment 114.

To generate a manifest 117 during the content stream 221, the manifest generation service 217 may determine a source of a sequentially next content fragment 114 of the content stream 221 for inclusion in the manifest 117. To do so, the manifest generation service 217 may calculate an estimated bandwidth 251 for a communications channel between the client 104 and the media distribution service 214. In some embodiments, the estimated bandwidth 251 may comprise an estimate for a discrete point in time. In other embodiments, the estimated bandwidth 251 may include projected or predicted estimate of bandwidth at a future instance in time, or as a continual projection over time. In some embodiments, the manifest generation service 217 may be configured to obtain and aggregate estimated bandwidths 251 from the client 104. In other embodiments, the manifest generation service 217 may access buffer state data 244 and stream history 247 for a last communicated content fragment 114 of the content stream 221. If the buffer state data 244 indicates that an amount of data or a duration of content stored in the buffer 237 increased, the manifest generation service 217 may determine that the estimated bandwidth 251 is greater than a bit rate for the last communicated content fragment 114. If the buffer state data 244 indicates that the amount of data or duration of content in the buffer 237 decreased, the manifest generation service 217 may determine that the estimated bandwidth 251 is less than the bit rate for the last communicated content fragment 114. Additionally, in some embodiments, the manifest generation service 217 may determine that the estimated bandwidth 251 is equal to the bit rate of the last communicated content fragment 114 unless a rate of change indicated in the buffer state data 244 meets or exceeds a predefined threshold.

Additionally, in some embodiments, the manifest generation service 217 may determine the bit rate for the sequentially next content fragment 114 according to an aggregate value, such as a running average, an exponential weighted average, or another aggregate value of a plurality of data points. These data points may include, for example, the amount of data stored in the buffer 237, a duration of content stored in the buffer 237, a rate of change of the amount of data or duration of content stored in the buffer 237, or other data. The manifest generation service 217 may then determine that the estimated bandwidth 251 as being greater or less than the bit rate of the last communicated content fragment 114 according to an increase or decrease in the running average.

As content fragments 114 for a sequentially next segment 234 may be encoded in multiple versions of known predefined bit rates, determining that the estimated bandwidth 251 as being less than or greater than the bit rate for the last communicated content fragment 114 may include determining the estimated bandwidth 251 as a next greatest or next lesser bit rate in a range of bit rates. For example, a bit rate for a last communicated content fragment 114 may be 2.0 megabits per second (MBPS). A sequentially next segment 234 may include content fragments 114 encoded at a range of bit rates of 1.0 MBPS, 1.5 MBPS, 2.0 MBPS, 2.5 MBPS and 3.0 MBPS, or potentially other bit rates. Determining that the estimated bandwidth 251 is greater than the bit rate of the last communicated content fragment 114 may then include determining the estimated bandwidth as 2.5 MBPS, the next greatest bit rate in the range. Conversely, determining that the estimated bandwidth 251 is less than the bit rate of the last communicated content fragment 114 may then include determining the estimated bandwidth as 1.5 MBPS, the next lesser bit rate in the range.

In some embodiments, the estimated bandwidth 251 may be calculated as an aggregate value of previously estimated bandwidths 251. The aggregate value may include a running average such as an exponential weighted average, or another value. For example, an estimated bandwidth 251 may be calculated as described above, or by another approach. That estimated bandwidth 251 is then modified by applying this value to the aggregate value.

In further embodiments, the manifest generation service 217 may be configured to calculate a confidence value 254 for the estimated bandwidth 251. For example, in embodiments in which the estimated bandwidth 251 is calculated according to a plurality of data points over time, the confidence value 254 may be calculated as a standard deviation or other value of the data points, and potentially other data. In embodiments in which the estimated bandwidth 251 is calculated as a function of previously estimated bandwidths 251, the manifest generation service 217 may calculate the confidence value 254 as a standard deviation of the previously estimated bandwidths 251.

After calculating the confidence value 254, the manifest generation service 217 may then modify the estimated bandwidth 251 according to the confidence value 254. In some embodiments, the manifest generation service 217 may scale or weigh the estimated bandwidth 251 by a factor based on the confidence value 254. In other embodiments, the manifest generation service 217 may modify the estimated bandwidth 251 to a greater or lesser value included in the range of bit rates for the sequentially next content fragment 114. The estimated bandwidth 251 may also be modified according to a confidence value 254 by another approach.

After calculating the estimated bandwidth 251 of the client 104, the manifest generation service 217 then selects a bit rate for the sequentially next content fragment 114. In embodiments in which the estimated bandwidth 251 matches a bit rate of a content fragment 114 at the sequentially next segment 234, the manifest generation service 217 may determine the bit rate as the estimated bandwidth 251.

In embodiments in which the estimated bandwidth 251 is an intermediary value between bit rates in the range of predefined bit rates for the content fragment 114, the manifest generation service 217 may select the bit rate as a next lowest or next latest bit rate in the range. In other embodiments, the manifest generation service 217 may select the bit rate as a value greater than the estimated bandwidth 251 responsive to an amount of data or duration of content in the buffer 237 meeting or exceeding a predefined threshold. The bit rate for the sequentially next content fragment 114 may also be selected by another approach.

In some embodiments, the manifest generation service 217 may be configured to override the selected bit rate, thereby modifying the selected bit rate to a new value. For example, the manifest generation service 217 may apply override rules 257 to the bit rate, the client 104, or other data. If one or more override rules 257 are satisfied, the manifest generation service 217 may then modify the selected bit rate.

In some embodiments, an override rule 257 may define how a bit rate may be selected for a particular device type of the client 104. For example, an override rule 257 may specify that a bit rate for a content stream 221 to a particular client type cannot change by a delta meeting or exceeding a predefined threshold. In such an embodiment, the override rule 257 may modify the bit rate for the sequentially next content fragment 114 to reduce the delta to within the predefined threshold. As another example, an override rule 257 may prevent clients 104 from rendering or downloading content at a particular bit rate, as clients 104 of that particular device type may experience bugs or glitches at the selected bit rate. Such an override rule 257 may then require that the selected bit rate be modified to a different value. Override rules 257 may also be applied by another approach.

After selecting the bit rate, the manifest generation service 217 then determines which content fragment 114 will be referenced in the manifest 117. In embodiments in which a single content fragment 114 for a sequentially next segment 234 is encoded at the selected bit rate, the manifest generation service 217 determines that this content fragment 114 will be referenced. In other embodiments, multiple content fragments 114 corresponding to the sequentially next segment 234 may be encoded at the selected bit rate, but differ according to other attributes. For example, content fragments 114 may include differing languages, censored or uncensored content, advertisements, localized content, or other differences. In such an embodiment, the manifest generation service 217 may select the content fragment 114 to be referenced according to a purchase history 224, user profile data 231, or other attributes.

For example, a recommendation for an advertisement may be determined from the purchase history 224 by any approach as can be appreciated. A content fragment 114 encoded at the selected bit rate and including the determined advertisement may then be selected for reference in the manifest 117. As another example, user profile data 231 may indicate certain age restrictions, content restrictions, censorship preferences, or other preferences. A content fragment 114 encoded at the selected bit rate and conforming to these preferences may then be selected for reference in the manifest 117. As a further example, user profile data 231 may indicate a region or other location attribute of a user. A content fragment 114 encoded at the selected bit rate and corresponding to regional content restrictions, content localizations, or otherwise associated with a location of the user may be selected for reference in the manifest 117.

After selecting the content fragment 114 to be referenced in the manifest 117, the manifest generation service 217 then generates the manifest 117. This may include encoding a URL or other source identifier to which requests 261 may be directed to obtain the selected content fragment 114. This may also include encoding metadata, such as a bit rate, language, encoding scheme, or other data in the manifest 117. The manifest generation service 217 then communicates the manifest 117 to the client 104. After obtaining the manifest 117, the client 104 then communicates a request 261 to the media distribution service 214 according to the source identifier encoded in the manifest 117. The process of maintaining the buffer state data 244 and stream history 247, calculating the estimated bandwidth 251, and generating and communicating the manifest 117 is repeated for subsequent content fragments 114 in the content stream 221 until the content stream 221 ends.

In other embodiments, the manifest generation service 217 may be configured to communicate a manifest 117 indicating multiple source identifiers or URLs for content fragments 114 of a content stream 221. For example, the manifest generation service 217 may be configured to communicate a manifest 117 including URLs of sources for content fragments 114 for the content stream 221 at the beginning of an on demand content stream. As another example, the manifest generation service 217 may be configured to repeatedly communicate manifests 117 indicating many sources for content fragments 114 of multiple bit rates to a client 104 during a live content stream 221. In these embodiments, a client application 241 facilitating the content stream 221 would need to select an appropriate source for requesting content fragments 114 of the content stream 221.

In embodiments in which a client application 241 is configured to select, during the content stream 221, a source from which content fragments 114 of a content stream 221 are requested, the client 104 may calculate an estimated latency 264 between the client 104 and the media distribution service 214. This may include, for example, calculating an estimated latency 264 as a time interval between a time when a request 261 for a previously downloaded or currently downloaded content fragment 114 was sent and a time when the corresponding content fragment 114 began downloading. This may also include calculating the estimated latency 264 as an aggregate value of multiple time intervals between times when requests 261 were sent and when corresponding content fragments 114 begin downloading. Such aggregate values may include a running average such as an exponentially weighted average, or another value.

The client application 241 may also be configured to calculate a confidence value 254 for the estimated latency 264. This may be calculated as a standard deviation or other value calculated as a function of multiple time intervals used to calculate an estimated latency 264, as a function of one or more previously calculated estimated latencies 264, or as a function of other data. The client application 241 may then modify the estimated latency 264 according to the confidence value 254. For example, the estimated latency 264 may be scaled, weighted, or otherwise modified as a function of the confidence value 254. In other embodiments, the estimated latency 264 may be increased or decreased responsive to the confidence value 254 falling above or below a predefined threshold. The estimated latency 264 may also be calculated according to a confidence value 254 by another approach.

Selecting a bit rate for requesting content fragments 114 of a content stream 221 may also include calculating a estimated bandwidth 251 by the client application 241. In some embodiments, this includes calculating the estimated bandwidth 251 as a size of a last downloaded or previously downloaded content fragment 114 divided by a time to download the respective content fragment 114. This may also include calculating an aggregate value of multiple times to download respective content fragments 114. For example, this may include calculating the size of a last downloaded or previously downloaded content fragment 114 divided by a time to download the respective content fragment 114 and applying this calculated value to a running average, exponentially weighted average, or other value. Other approaches may also be used to calculate the estimated bandwidth 251.

The client application 241 may also be configured to calculate a confidence value 254 for the estimated bandwidth 251. This may be calculated as a standard deviation or other value calculated as a function one or more previously calculated estimated bandwidths 251, or as a function of other data. The client application 241 may then modify the estimated bandwidth 251 according to the confidence value 254. For example, the estimated bandwidth 251 may be scaled, weighted, or otherwise modified as a function of the confidence value 254. In other embodiments, the estimated bandwidth 251 may be increased or decreased responsive to the confidence value 254 falling above or below a predefined threshold. The estimated bandwidth 251 may also be calculated according to a confidence value 254 by another approach.

The client application 241 then selects a source identified in a previously downloaded manifest 117 from which content fragments 114 will be requested. In some embodiments, this may include calculating, for each of the sources indicated in the manifest 117, a selection score 267. The selection score 267 may be calculated according to a degree to which one or more selection rules are satisfied by the respective sources. The selection rules may be applied to the bit rates of the respective sources, the estimated latency 264, the estimated bandwidth 251, an amount of data or a duration of content in a buffer 237, or other data. For example, given the estimated latency 264 and estimated bandwidth 251, a selection rule may be satisfied if an estimated time to send a request 261 to the respective source and completely download a content fragment 114 from the respective source meets or exceeds a predefined time threshold.

The predefined time threshold may be defined as a function of a duration of content stored in the buffer 237. As a non-limiting example, the predefined time threshold may be defined as twenty-five percent or another value of the duration of content stored in the buffer 237. The predefined time threshold may also be defined as a function of a duration of content in a content fragment 114. As a non-limiting example, the predefined time threshold may be defined as twice the duration of content in the sequentially next content fragment 114.

As another non-limiting example, given the estimated latency 264 and estimated bandwidth 251, a selection rule may be satisfied if a duration of content projected to be in the buffer 237 after downloading the sequentially next content fragment 114 meets or exceeds a predefined threshold. For example, the predefined threshold may be defined as ten seconds or another value of content stored in the buffer 237, or as another duration. Selection rules may also be satisfied by another approach.

After calculating selection scores 267 for each of the sources indicated in a manifest 117, the client application 241 selects a source from which a sequentially next content fragment 114 will be requested. This may include selecting a source having a highest quality level from a subset of sources whose selection scores 267 meet or exceed a predefined threshold. The quality level may be defined as a bit rate, a resolution, or as a function of other attributes. Selecting the source may also be determined according to language settings, location information, the application of override rules 257, or by other approaches as was described above with respect to the manifest generation service 217.

In some embodiments, the client application 241 may also determine when to send a request 261, hereinafter known as a request time 271, such that the requested content fragment 114 begins downloading as close to the completion of a download of a currently downloading content fragment 114. This prevents the request 261 from being sent too early, thereby potentially resulting in multiple content fragments 114 being downloaded simultaneously, thereby using more bandwidth. This also prevents the request 261 from being sent too late, thereby potentially resulting in avoidable buffer 237 usage.

To calculate the request time 271, the client application 241 calculates a projected time to complete the download of a currently downloading content fragment 114. This may be performed by determining an amount of the content fragment 114 left to be downloaded by subtracting an amount downloaded from a size of the content fragment 114 as indicated in a manifest 117 or determined by another approach. The amount left to be downloaded is then divided by the estimated bandwidth 251 to determine a projected time to complete the download. The estimated latency 264 is then added or subtracted from the projected time to complete the download in order to determine the request time 271.

In some embodiments, the request time 271 may be modified according to a confidence value 254 for the estimated bandwidth 251, the estimated latency 264, or by another approach. For example, the request time 271 may be weighted, scaled, or modified as a function of a confidence value 254. As another example, the request time 271 may be modified by a predefined amount of time responsive to a confidence value 254 falling below a predefined threshold. The request time 271 may also be reduced or modified by a predefined offset value to reduce the likelihood of a request 261 being sent too late. The request time 271 may also be modified by another approach.

The client application 241 then communicates a request 261 to the selected source at the request time 271. The determination of a source in a manifest 117, determination of a request time 271 and communications of requests 261 is repeated until the content stream 221 concludes.

Although the discussion presented herein describes the communication of a manifest 117 to a client 104 indicating the source of content portions 114, it is understood that an indication of a source of content portions 114 may also be included in other data, or by another approach.

Figure 3:
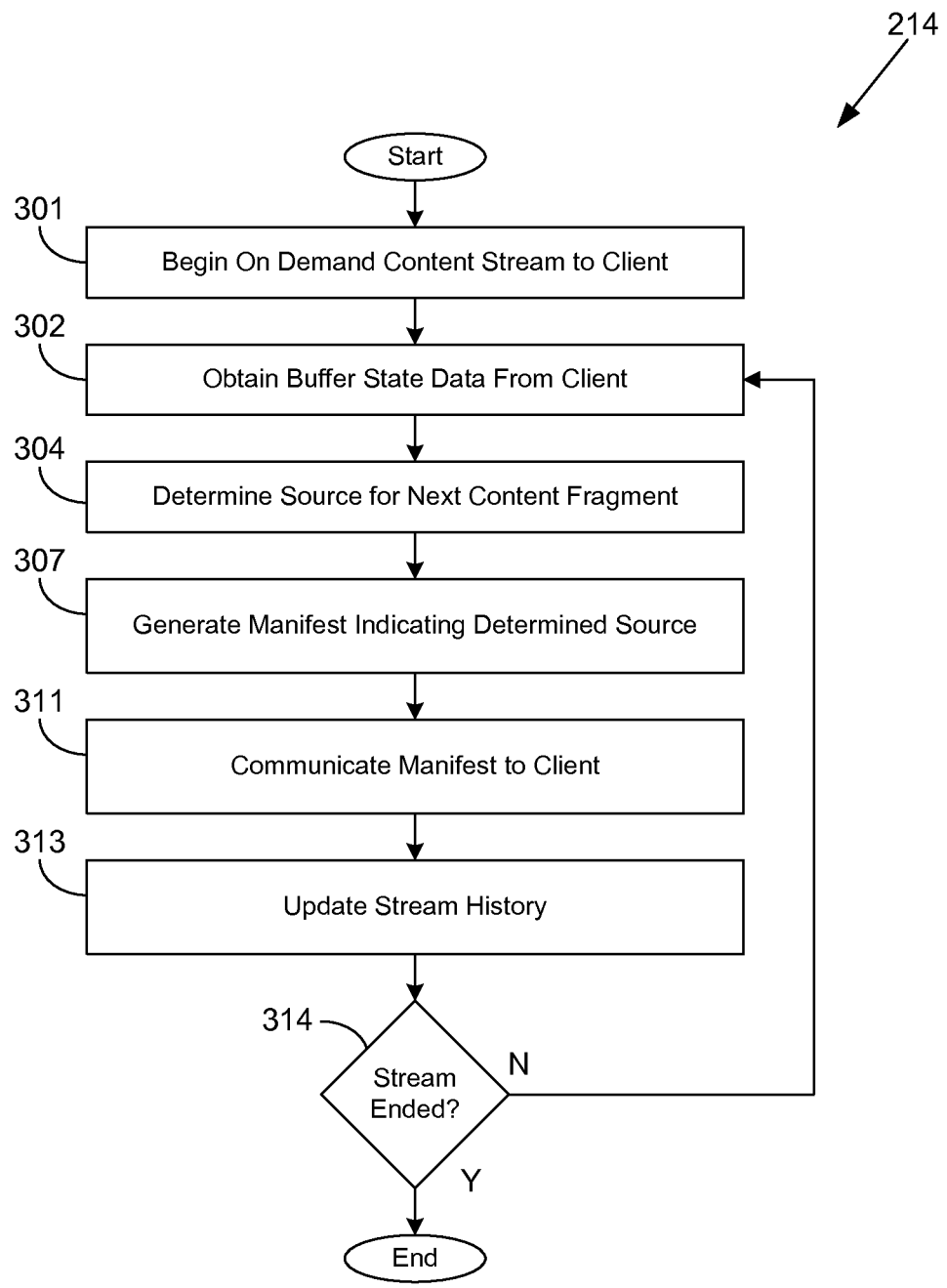
FIGS. 3 and 4 are flowcharts illustrating one example of functionality implemented as portions of a manifest generation service executed in a computing environment in the networked environment of FIG. 2 according to various embodiments of the present disclosure.

Referring next to FIG. 3, shown is a flowchart that provides one example of the operation of a portion of the media distribution service 214 implementing a manifest generation service 217 (FIG. 2) according to various embodiments. It is understood that the flowchart of FIG. 3 provides merely an example of the many different types of functional arrangements that may be employed to implement the operation of the portion of the media distribution service 214 as described herein. As an alternative, the flowchart of FIG. 3 may be viewed as depicting an example of elements of a method implemented in the computing environment 201 (FIG. 2) according to one or more embodiments.

Beginning with box 301, the media distribution service 214 begins an on demand content stream 221 (FIG. 2) of a media item 219 (FIG. 2) to a client 104 (FIG. 1). During the content stream 221, in box 302, the manifest generation service 217 obtains buffer state data 244 (FIG. 2) from the client 104. The buffer state data 244 may indicate, for example, an amount of data stored in a buffer 237 (FIG. 2) of a client 104, a duration of content stored in the buffer 237, a size of the buffer 237, a rate of change of an amount of stored data or duration of stored content, or other data.

Next, in box 304, the manifest generation service 217 determines a source from which the client 104 should request a sequentially next content fragment 114, as will be described in more detail below with reference to FIG. 4. The manifest generation service 217 then generates a manifest 117 (FIG. 1) indicating the determined source of content fragments 114. This may include, for example, encoding a Uniform Resource Locator (URL), network address, or other source identifier in a manifest 117. This may also include encoding associated metadata, including bit rate data, language data, content rating data, encoding scheme data, or other data in the manifest. The manifest generation service 217 then communicates the manifest 117 to the client in box 311.

The stream history 247 (FIG. 2) is then updated to reflect the bit rate or other attributes corresponding to the source indicated in the manifest 117 in box 313. In box 314, the media distribution service 214 determines if the content stream 221 has ended. If the content stream 221 has not ended, the process returns to box 302, where the manifest generation service 217 continues to generate updated manifests 117 for communication to the client 104. Otherwise, the process ends.

Figure 4:
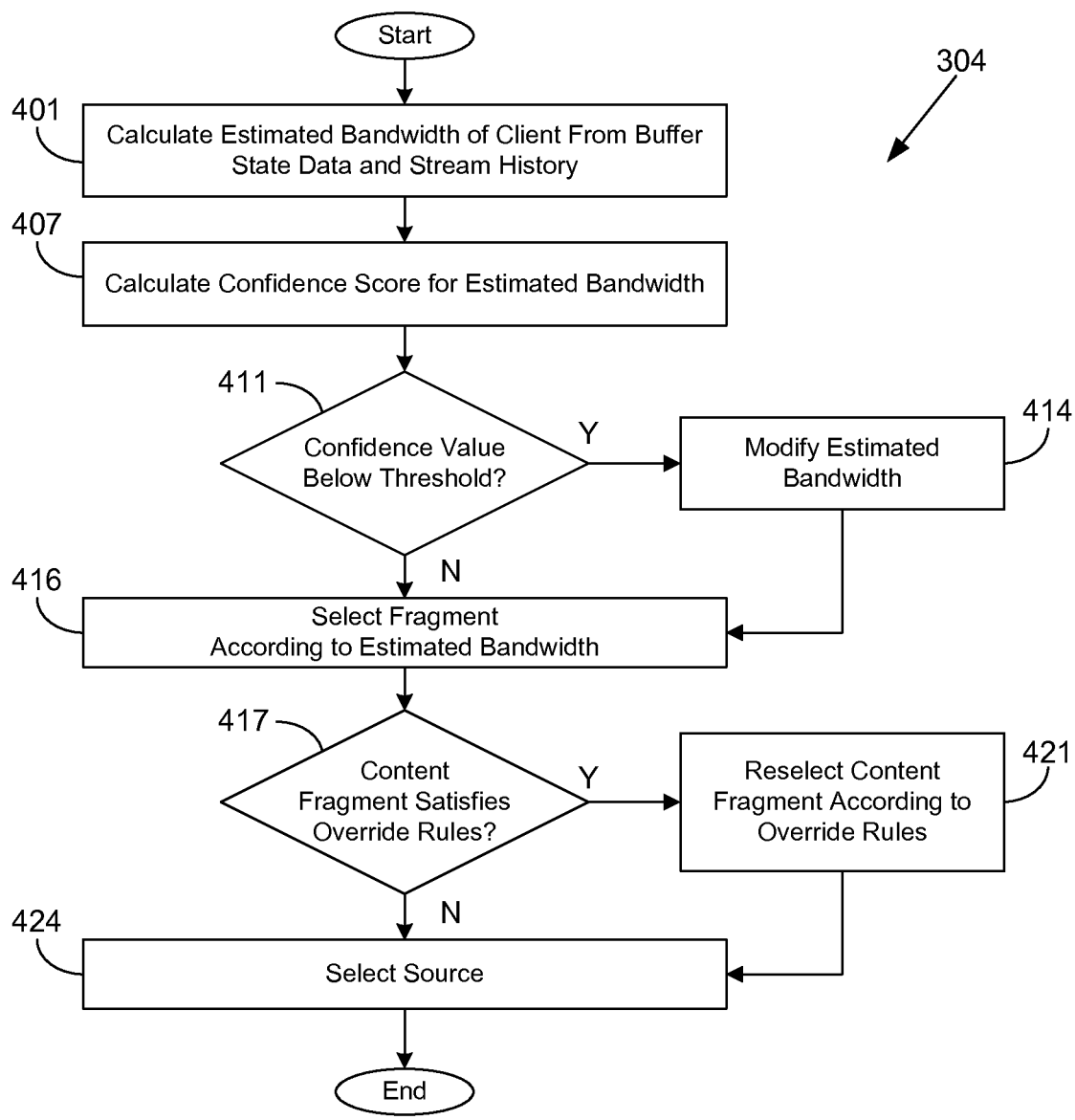

Turning now to FIG. 4, shown is a flowchart that provides one example of the operation of a portion of the manifest generation service 217 (FIG. 2) as was discussed above with respect to box 304 of FIG. 3 according to various embodiments. It is understood that the flowchart of FIG. 4 provides merely an example of the many different types of functional arrangements that may be employed to implement the operation of the portion of the manifest generation service 217 as described herein. As an alternative, the flowchart of FIG. 4 may be viewed as depicting an example of elements of a method implemented in the computing environment 201 (FIG. 2) according to one or more embodiments.

Beginning with box 401, the manifest generation service 217 calculates an estimated bandwidth 251 (FIG. 2) for the client 104 (FIG. 1) using buffer state data 244 (FIG. 2), stream history 247 (FIG. 2), and potentially other data. In some embodiments, this may include determining the buffer state data 244 indicates that an amount of data or a duration of content stored in the buffer 237 (FIG. 2) increased or decreased during or after a download of a last communicated content fragment 114 (FIG. 1). An increase may indicate that the estimated bandwidth 251 is greater than a bit rate for the last communicated content fragment 114. A decrease may indicate that the estimated bandwidth 251 is less than the bit rate for the last communicated content fragment 114. Additionally, in some embodiments, the manifest generation service 217 may determine that the estimated bandwidth 251 is equal to the bit rate of the last communicated content fragment 114 unless a rate of change indicated in the buffer state data 244 meets or exceeds a predefined threshold.

Additionally, in some embodiments, the manifest generation service 217 may calculate the estimated bandwidth 251 according to a running average, such as an exponential weighted average, or another aggregate value of a plurality of data points. These data points may include, for example, the amount of data stored in the buffer 237, a duration of content stored in the buffer 237, a rate of change of the amount of data or duration of content stored in the buffer 237, or other data. The manifest generation service 217 may then determine that the estimated bandwidth 251 as being greater or less than the bit rate of the last communicated content fragment 114 according to an increase or decrease in the running average.

In other embodiments, the manifest generation service 217 may be configured to maintain two running averages of the data points according to differing criteria. For example, a first exponential weighted average may be weighted by a first constant, while a second running average may be weighted by a second constant greater than the first constant. According to these approaches, a single data point may perturb the second running average to lesser degree than the first. The first and second exponential weighted averages may also be calculated according to differing data sets. For example, the first exponential weighted average may be calculated according to the last N values in a time series, while the second exponential weighted average may be calculated according to a last M values in the time series, with M being greater than M. Again, by calculating the second exponential weighted average using a greater number of data points in a time series, a single data point perturbs the second exponential weighted average to a lesser degree.

The manifest generation service 217 may then track trend lines of the first and second exponential weighted averages. The manifest generation service 217 may then determine that the estimated bandwidth 251 is greater or less than the bit rate of the last communicated content fragment 114 when the trend lines cross, i.e. when the first exponential weighted average transitions from being greater than the second exponential weighted average to being less than the second exponential weighted average, or when the first exponential weighted average transitions from being less than the second exponential weighted average to being greater than the second exponential weighted average.

For example, when the trend lines of the first and second exponential weighted averages cross and the first and second exponential weighted averages are increasing, the manifest generation service 217 may determine that the bit rate of the content stream 221 (FIG. 2) should be increased, i.e. that the estimated bandwidth 251 is greater than the bit rate of the last communicated content fragment 114. As another example, when the trend lines of the first and second exponential weighted averages cross and the first and second exponential weighted averages are decreasing, the manifest generation service 217 may determine that the bit rate of the content stream 221 should be decreased, i.e. that the estimated bandwidth 251 is less than the bit rate of the last communicated content fragment 114.

As the sequentially next content fragment 114 may be encoded in multiple versions of known predefined bit rates, determining that the estimated bandwidth 251 as being less than or greater than the bit rate for the last communicated content fragment 114 may include determining the estimated bandwidth 251 as a next greatest or next lesser bit rate in a range of bit rates. In some embodiments, the estimated bandwidth 251 may be calculated as a running average of previously estimated bandwidths 251. The running average may include an exponential weighted average, or another running average. For example, an estimated bandwidth 251 may be calculated as described above, or by another approach. That estimated bandwidth 251 is then modified by applying this value to the running average.

Next, in box 407, the manifest generation service 217 calculates a confidence value 254 (FIG. 2) for the estimated bandwidth 251. Generally, a confidence value 254 is a numerical representation of confidence in an estimate. The confidence value 254 may be used to further modify, refine, or otherwise change the estimate to reflect the degree of confidence. For example, in embodiments in which the estimated bandwidth 251 is calculated according to a plurality of data points over time, the confidence value 254 may be calculated as a standard deviation or other value of the data points, and potentially other data. In embodiments in which the estimated bandwidth 251 is calculated as a function of previously estimated bandwidths 251, the manifest generation service 217 may calculate the confidence value 254 as a standard deviation of the previously estimated bandwidths 251.

After calculating the confidence value 254, the manifest generation service 217 may then determines if the confidence value 254 falls below a predefined threshold in box 411. If so, the process advances to box 414 where the estimated bandwidth 251 is modified. In some embodiments, the manifest generation service 217 may scale or weigh the estimated bandwidth 251 by a factor based on the confidence value 254. In other embodiments, the manifest generation service 217 may modify the estimated bandwidth 251 to a greater or lesser value included in the range of bit rates for the sequentially next content fragment 114. The estimated bandwidth 251 may also be modified by another approach. The process then advances to box 417.

If the confidence value 254 meets or exceeds the predefined threshold as determined in box 411, the process instead advances to box 416 where a sequentially next content fragment 114 is selected according to the estimated bandwidth 251. This may include, for example, selecting a bit rate of a content fragment 114 matching the estimated bandwidth 251, a bit rate of a content fragment 114 within a predefined delta of the estimated bandwidth 251, a bit rate of a content fragment 114 having a highest bit rate below the estimated bandwidth 251, or by another approach.

Next, in box 417, the manifest generation service 217 determines if any override rules 257 (FIG. 2) are satisfied. Override rules 257 may be satisfied according to an estimated bandwidth 251, a device type for a client 104, a selected bit rate for a source as determined in box 416, or according to other data. If the override rules 257 are satisfied, the manifest generation service 217 may then modify the selected bit rate.

In some embodiments, an override rule 257 may define how a bit rate may be selected for a particular device type of the client 104. For example, an override rule 257 may specify that a bit rate for a content stream 221 to a particular client type cannot change by a delta meeting or exceeding a predefined threshold. In such an embodiment, the override rule 257 may modify the bit rate for the sequentially next content fragment 114 to reduce the delta to within the predefined threshold. As another example, an override rule 257 may indicate that clients 104 of a particular device type experience bugs or glitches when rendering content fragments 114 at the selected bit rate. Such an override rule 257 may then require that the selected bit rate be modified to a different value.

As an additional example, an override rule 257 may restrict the selection of a particular bit rate for content fragments 114 encoded using a particular codec or encoding scheme. Override rules 257 may also indicate, for a particular device type, a maximum resolution, frame rate, or other parameter of the rendering capabilities of a device. If a selected bit rate exceeds a limitation of these parameters, the override rule 257 may require that the bit rate be modified to be within these limitations. For example, device type may have a maximum rendering capability of 720p video. A selected bit rate may correspond to a content fragment 114 encoded at 1080p, or another resolution greater than the maximum rendering capability of the client 104. The override rule 257 may indicate that the bit rate should be lowered to a content fragment 114 within the maximum rendering capability of the client 104.

As a further example, an override rule 257 may redefine a sequentially next content fragment 114 to be sent to a client 104 if a content fragment 114 is corrupted or otherwise in violation of a validation or verification policy. For example, in some embodiments, a content fragment 114 previously communicated to a client 104 may be corrupted. The client 104 may communicate an indication or notification of the corruption to the manifest generation service 217. In response to this notification, the manifest generation service 217 may select a different content fragment 114 for the same segment 234 as the corrupted content fragment 114, and select that fragment 114 for reference in the manifest 117. In other embodiments, a particular content fragment 114 may be known to be corrupted. If the manifest generation service 117 determines that a source for the corrupted content fragment 114 is to be included in the manifest, the override rule 257 may require the selection of a different content fragment 114 from the same segment 234 as the corrupted content fragment 114. Override rules 257 may also be applied by another approach.

If no override rules 257 are satisfied, the process advances directly to box 424. Otherwise, if an override rule 257 is satisfied, the process advances to block 421 where the selected content fragment 114 is reselected according to the override rules 257. This may include, for example, selecting a content fragment 114 of a different bit rate according to various approaches. For example, in some embodiments, the override rule 257 may specify that if the override rule 257 is satisfied, the bit rate should be incremented or decremented until the override rule 257 is satisfied. In other embodiments, the override rule 257 may define a default bit rate to which the bit rate will be modified. The override rules 257 may also be applied by another approach. After reselecting the content fragment 114, the process advances to box 424.

In box 424, the manifest generation service 217 determines a source for content fragments 114 to be encoded in a manifest 117. A source is considered a network address, identifier, Uniform Resource Locator (URL), application program interface (API) call, or other data accessible to a client 104 from which content fragments 114 may be requested. Determining a source for content fragments 114 may include selecting a URL or identifier corresponding to content fragments 114 of the selected bit rate. In embodiments in which multiple sources are available for content fragments 114 of the selected bit rate, the manifest generation service 217 may select the source according to other data, including a purchase history 224 (FIG. 2), user profile data 231 (FIG. 2), or other data. After selecting the source of content fragments 114, the process ends.

Figure 5:
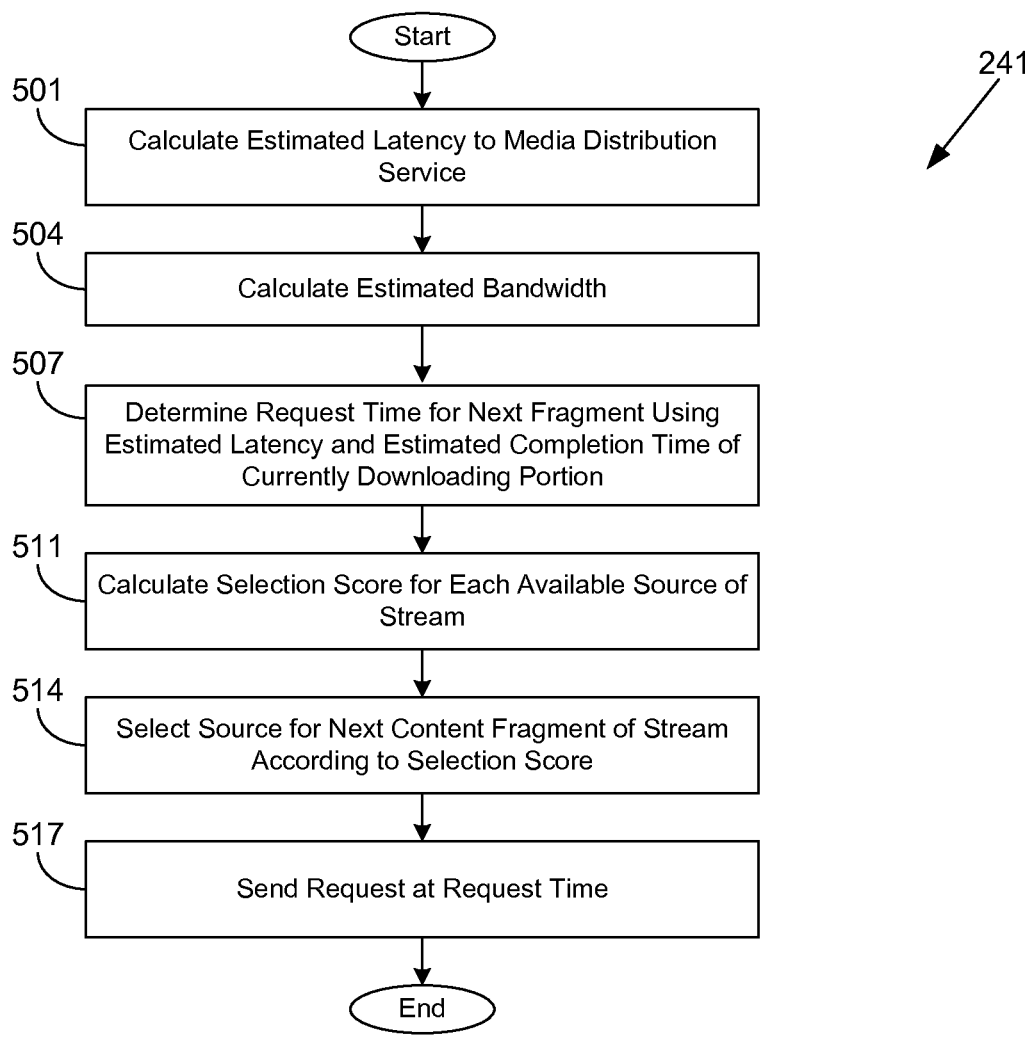
FIG. 5 is a flowcharts illustrating one example of functionality implemented as portions of a client application executed in a client in the networked environment of FIG. 2 according to various embodiments of the present disclosure.

Turning now to FIG. 5, shown is a flowchart that provides one example of the operation of a portion of the client application 241 according to various embodiments. It is understood that the flowchart of FIG. 5 provides merely an example of the many different types of functional arrangements that may be employed to implement the operation of the portion of the client application 241 as described herein. As an alternative, the flowchart of FIG. 5 may be viewed as depicting an example of elements of a method implemented in the client 104 (FIG. 1) according to one or more embodiments.

Beginning with box 501, the client application 241 calculates an estimated latency 264 (FIG. 2) between the client 104 and the media distribution service 214 (FIG. 2). This may include, for example, calculating an estimated latency 264 as a time interval between a time when a request 261 (FIG. 2) for a previously downloaded or currently downloaded content fragment 114 (FIG. 1) was sent and a time when the corresponding content fragment 114 began downloading. This may also include calculating the estimated latency 264 as an aggregate value of multiple time intervals between times when requests 261 were sent and when corresponding content fragments 114 begin downloading. Such aggregate values may include a running average, which may be calculated as an average of the last N previous data points. Such aggregate values may also include an exponentially weighted average. An exponentially weighted average may be calculated by multiplying a last calculated exponentially weighted average by a constant. The next data point is then added to that value, and the total is divided by the constant plus one. The aggregate value may also include other values.

Calculating the estimated latency 264 may also include calculating a confidence value 254 (FIG. 2) for the estimated latency 264, as mentioned above. The confidence value 254 is a quantitative evaluation of the confidence in estimating the latency. The confidence value 254 may then be used to adjust, refine, or otherwise modify the estimated latency 264. The confidence value 254 may be calculated as a standard deviation or other value calculated as a function of multiple time intervals used to calculate an estimated latency 264, as a function of one or more previously calculated estimated latencies 264, or as a function of other data. Thus, if a series of data points used to calculate an estimated latency 264 has a high standard deviation, the resulting confidence value 254 would be lowered. If the standard deviation is low, indicating a low variance in the values used to calculate the estimated latency 264, this may result in a greater confidence value 254.

The client application 241 may then modify the estimated latency 264 according to the confidence value 254. For example, the estimated latency 264 may be scaled, weighted, or otherwise modified as a function of the confidence value 254. As a non-limiting example, if the confidence value 254 is embodied as a fraction or percentile value, the estimated latency 264 may be modified by multiplying it by the confidence value 254. In other embodiments, the estimated latency 264 may be increased or decreased responsive to the confidence value 254 falling above or below a predefined threshold. For example, if the confidence value 254 falls below a threshold, the estimated latency 264 may be decremented or scaled by a predefined value, as it may be preferable to underestimate latency as opposed to overestimate latency. The estimated latency 264 may also be calculated or modified according to a confidence value 254 by another approach.

Next, in box 504, the client application 241 calculates an estimated bandwidth 251 of the client 104. In some embodiments, this includes calculating the estimated bandwidth 251 as a size of a last downloaded or previously downloaded content fragment 114 divided by a time to download the respective content fragment 114. This may also include calculating an aggregate value of multiple times to download respective content fragments 114. For example, this may include calculating the size of a last downloaded or previously downloaded content fragment 114 divided by a time to download the respective content fragment 114 and applying this calculated value to a running average, exponentially weighted average, or other value. Other approaches may also be used to calculate the estimated bandwidth 251.

Calculating the estimated bandwidth 251 for a client 104 may also include calculating a confidence value 254 for the estimated bandwidth 251, indicating a quantitative estimate in the confidence in the estimate of bandwidth. This may be calculated as a standard deviation or other value calculated as a function one or more previously calculated estimated bandwidths 251, or as a function of other data. Thus, if a series of data points used to calculate an estimated bandwidth 251 has a high standard deviation, the resulting confidence value 254 would be lowered. If the standard deviation is low, indicating a low variance in the values used to calculate the estimated bandwidth 251, this may result in a greater confidence value 254. The client application 241 may then modify the estimated bandwidth 251 according to the confidence value 254. For example, the estimated bandwidth 251 may be scaled, weighted, or otherwise modified as a function of the confidence value 254. As a non-limiting example, if the confidence value 254 is embodied as a fraction or percentile value, the estimated bandwidth 251 may be modified by multiplying it by the confidence value 254. In other embodiments, the estimated bandwidth 251 may be increased or decreased responsive to the confidence value 254 falling above or below a predefined threshold. For example, if the confidence value 254 falls below a threshold, the estimated bandwidth 251 may be decremented or scaled by a predefined value, as it may be preferable to underestimate bandwidth as opposed to overestimate bandwidth. As another example, if the confidence value 254 for the estimated bandwidth 251 falls below a predefined threshold, the estimated bandwidth 251 may be redefined to a bit rate in a range of bit rates for content fragments 114. For example, the estimated bandwidth 251 may be lowered to a highest bit rate in the range that is less than the current estimated bandwidth 251. The estimated bandwidth 251 may also be calculated or modified according to a confidence value 254 by another approach After calculating the estimated latency 264 and estimated bandwidth 251, in box 507, the client application 241 calculates a request time 271 defining when a request 161 for a sequentially next content fragment 114 will be sent to the media distribution service 214. This may include, for example, calculating a projected time to complete a download of a currently downloading content fragment 114. This may be performed by determining an amount of the content fragment 114 left to be downloaded by subtracting an amount downloaded from a size of the content fragment 114 as indicated in a manifest 117 (FIG. 1) or determined by another approach. The amount left to be downloaded is then divided by the estimated bandwidth 251 to determine a projected time to complete the download. The estimated latency 264 is then added or subtracted from the projected time to complete the download in order to determine the request time 271.

In some embodiments, the request time 271 may be modified according to a confidence value 254 for the estimated bandwidth 251, a confidence value 254 for the estimated latency 264, or by another approach. For example, the request time 271 may be weighted, scaled, or modified as a function of a confidence value 254. As another example, the request time 271 may be modified by a predefined amount of time responsive to a confidence value 254 falling below a predefined threshold. The request time 271 may also be modified by another approach.

Next, in box 511, the client application 241 calculates, for each of the sources indicated in a manifest 117, a selection score 267 (FIG. 2). The selection score 267 may be calculated according to a degree to which one or more selection rules are satisfied by the respective sources. Selection rules define one or more criteria or attributes associated with the client 104, content stream 221, content fragments 114, or other data that, if met, result in the satisfaction of the selection rule. The selection rules may be applied to the bit rates of the respective sources, the estimated latency 264, the estimated bandwidth 251, an amount of data or a duration of content in a buffer 237 (FIG. 2), or other data. For example, given the estimated latency 264 and estimated bandwidth 251, a selection rule may be satisfied if an estimated time to send a request 261 to the respective source and completely download a content fragment 114 from the respective source meets or exceeds a predefined time threshold.

The predefined time threshold may be defined as a function of a duration of content stored in the buffer 237. As a non-limiting example, the predefined time threshold may be defined as twenty-five percent of the duration of content stored in the buffer 237. The predefined time threshold may also be defined as a function of a duration of content in a content fragment 114. As a non-limiting example, the predefined time threshold may be defined as twice the duration of content in the sequentially next content fragment 114.

As another non-limiting example, given the estimated latency 264 and estimated bandwidth 251, a selection rule may be satisfied if a duration of content projected to be in the buffer 237 after downloading the sequentially next content fragment 114 meets or exceeds a predefined threshold. For example, the predefined threshold may be defined as ten seconds of content stored in the buffer 237, or as another duration. Selection rules may also define other criteria or attributes that, if satisfied, positively contribute to a selection score 267.

After calculating selection scores 267 for each of the sources indicated in a manifest 117, the client application 241 selects a source from which a sequentially next content fragment 114 will be requested in box 514. This may include selecting a source having a highest quality level from a subset of sources whose selection scores 267 meet or exceed a predefined threshold. The quality level may be defined as a bit rate, a resolution, or as a function of other attributes. Selecting the source may also be determined according to language settings, location information, the application of override rules 257 (FIG. 2), or by other approaches as was described above with respect to the manifest generation service 217. In box 517, the client application 241 then communicates a request 261 to the selected source at the request time 271, after which the process ends.

Figure 6:
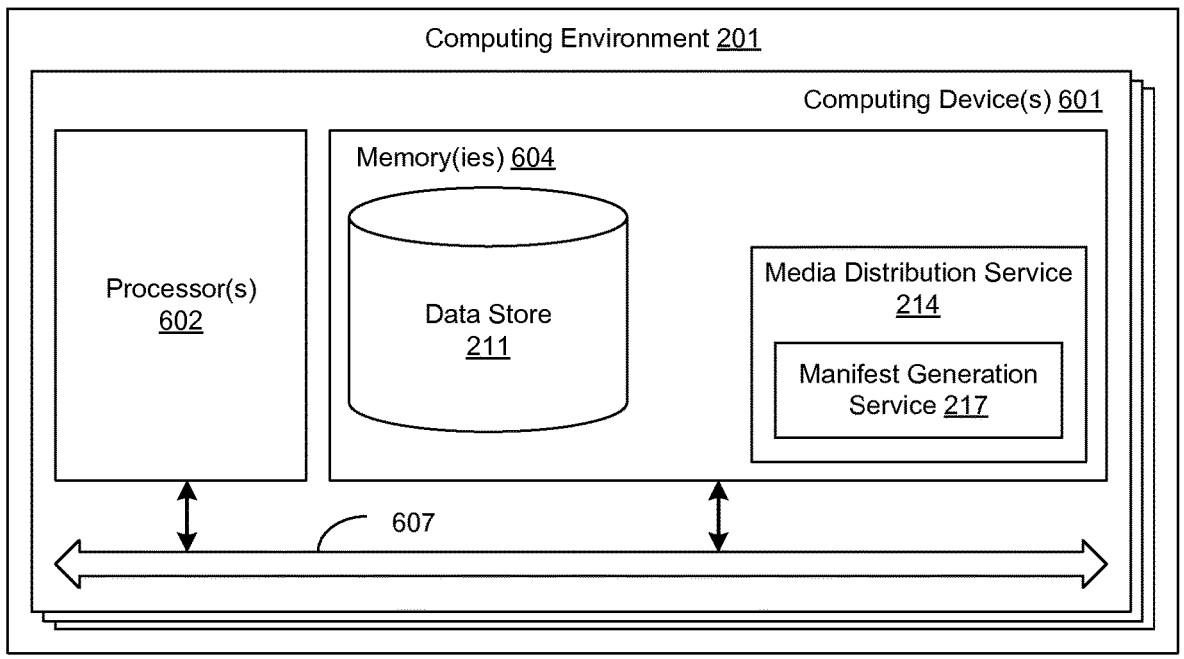
FIG. 6 is a schematic block diagram that provides one example illustration of a computing environment employed in the networked environment of FIG. 2 according to various embodiments of the present disclosure.

With reference to FIG. 6, shown is a schematic block diagram of the computing environment 201 according to an embodiment of the present disclosure. The computing environment 201 includes one or more computing devices 601. Each computing device 601 includes at least one processor circuit, for example, having a processor 602 and a memory 604, both of which are coupled to a local interface 607. To this end, each computing device 601 may comprise, for example, at least one server computer or like device. The local interface 607 may comprise, for example, a data bus with an accompanying address/control bus or other bus structure as can be appreciated.

Stored in the memory 604 are both data and several components that are executable by the processor 602. In particular, stored in the memory 604 and executable by the processor 602 are a media distribution service 214 having a manifest generation service 217, and potentially other applications. Also stored in the memory 604 may be a data store 211 and other data. In addition, an operating system may be stored in the memory 604, the operating system being executable by the processor 602.

Figure 7:
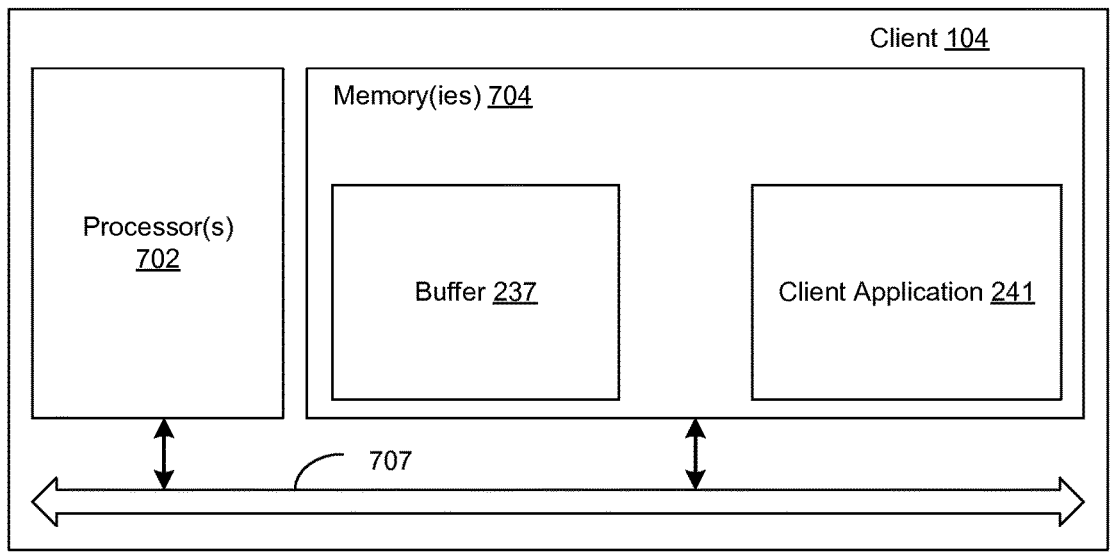
FIG. 7 is a schematic block diagram that provides one example illustration of a client employed in the networked environment of FIG. 2 according to various embodiments of the present disclosure.

With reference to FIG. 7, shown is a schematic block diagram of the client 104 according to an embodiment of the present disclosure. The client 104 includes at least one processor circuit, for example, having a processor 702 and a memory 704, both of which are coupled to a local interface 707. To this end, the client 104 may comprise, for example, at least one computer or like device. The local interface 707 may comprise, for example, a data bus with an accompanying address/control bus or other bus structure as can be appreciated.

Stored in the memory 704 are both data and several components that are executable by the processor 702. In particular, stored in the memory 704 and executable by the processor 702 are a client application 241. Also stored in the memory 704 may be a buffer 237 and other data. In addition, an operating system may be stored in the memory 704, the operating system being executable by the processor 702.

It is understood that there may be other applications that are stored in the memory 604 or 704 and are executable by the processor 602 or 702 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 604 or 704 and are executable by the processor 602 or 702. In this respect, the term "executable" means a program file that is in a form that can ultimately be run by the processor 602 or 702. Examples of executable programs may be, for example, a compiled program that can be translated into machine code in a format that can be loaded into a random access portion of the memory 604 or 704 and run by the processor 602 or 702, source code that may be expressed in proper format such as object code that is capable of being loaded into a random access portion of the memory 604 or 704 and executed by the processor 602 or 702, or source code that may be interpreted by another executable program to generate instructions in a random access portion of the memory 604 or 704 to be executed by the processor 602 or 702, etc. An executable program may be stored in any portion or component of the memory 604 or 704 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 604 or 704 is defined herein as including both volatile and nonvolatile memory and data storage components. Volatile components are those that do not retain data values upon loss of power. Nonvolatile components are those that retain data upon a loss of power. Thus, the memory 604 or 704 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 602 or 702 may represent multiple processors 602 or 702 and/or multiple processor cores and the memory 604 or 704 may represent multiple memories 604 or 704 that operate in parallel processing circuits, respectively. In such a case, the local interface 607 or 707 may be an appropriate network that facilitates communication between any two of the multiple processors 602 or 702, between any processor 602 or 702 and any of the memories 604 or 704, or between any two of the memories 604 or 704, etc. The local interface 607 or 707 may comprise additional systems designed to coordinate this communication, including, for example, performing load balancing. The processor 602 or 702 may be of electrical or of some other available construction.

Although the manifest generation service 217, client application 241, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 3, 4 and 5 show the functionality and operation of an implementation of portions of the manifest generation service 217 or client application 241, respectively. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 602 or 702 in a computer system or other system. The machine code may be converted from the source code, etc. If embodied in hardware, each block may represent a circuit or a number of interconnected circuits to implement the specified logical function(s).

Although the flowcharts of FIGS. 3, 4 and 5 show a specific order of execution, it is understood that the order of execution may differ from that which is depicted. For example, the order of execution of two or more blocks may be scrambled relative to the order shown. Also, two or more blocks shown in succession in FIGS. 3, 4 and 5 may be executed concurrently or with partial concurrence. Further, in some embodiments, one or more of the blocks shown in FIGS. 3, 4 and 5 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including a manifest generation service 217 or client application 241, that comprises software or code can be embodied in any non-transitory computer-readable medium for use by or in connection with an instruction execution system such as, for example, a processor 602 or 702 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including a manifest generation service 217 or client application 241, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 601 or client 104, or in multiple computing devices in the same computing environment 201. Additionally, it is understood that terms such as "application," "service," "system," "engine," "module," and so on may be interchangeable and are not intended to be limiting.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A method, comprising:

beginning, by at least one computing device, streaming of a media item, the media item comprising a plurality of content fragments; and during the streaming of the media item over time:

obtaining, by the at least one computing device and from a client device, a respective state of a buffer of the client device corresponding to at least one size and at least one encoding bit rate attribute for a respective last requested content fragment, wherein the respective state of the buffer describes a respective duration of buffered content corresponding to the respective last requested content fragment transferred to the client device over time;

updating, by the at least one computing device, a stream history to store the at least one encoding bit rate attribute and the at least one size for the respective last requested content fragment transferred to the client device over time;

calculating, by the at least one computing device, an estimated bandwidth of a communications channel to the client device based at least in part on a correlation between the at least one encoding bit rate attribute and the at least one size stored in the stream history by the at least one computing device, and an effect on the respective state of the buffer of the client device while streaming the content fragments over time;

calculating, by the at least one computing device, a confidence value associated with the estimated bandwidth;

selecting, by the at least one computing device, a sequentially next content fragment of the streaming media item for the client device based at least in part on the estimated bandwidth, the confidence value, and an amount of buffered content;

communicating, by the at least one computing device, a manifest file to the client device, the manifest file including a single resource locator of a plurality of resource locators associated with the sequentially next content fragment of the streaming media item for reference by the client device, the manifest file excluding a remainder of the plurality of resource locators based at least in part on a purchase history associated with a user of the client device; and updating, by the at least one computing device, the stream history to store at least one encoding bit rate attribute and at least one size for the sequentially next content fragment.

2. The method of claim 1, wherein the confidence value is based at least in part on a standard deviation associated with the respective state of the buffer.

3. The method of claim 1, wherein the sequentially next content fragment of the streaming media item is selected as having a bit rate less than the estimated bandwidth responsive to the confidence value falling below a predefined threshold.

4. The method of claim 1, wherein the sequentially next content fragment of the streaming media item is selected based at least in part on a plurality of override rules corresponding to a device type.

5. The method of claim 1, wherein the sequentially next content fragment of the streaming media item is selected as having a bit rate greater than the estimated bandwidth responsive to an estimated download time of the sequentially next content fragment of the streaming media item being less than or equal to a sum of a first duration of the sequentially next content fragment of the streaming media item and a second duration of at least a portion of the amount of buffered content.

6. A system, comprising:

a memory configured to store computer-readable instructions; and at least one computing device configured, through execution of the computer-readable instructions, to:

begin a stream of content on a client device, the stream of content comprising a plurality of content fragments; and following communication of individual last communicated content fragments of the plurality of content fragments during the stream of content over time:

obtain, from the client device, a respective state of a buffer of the client device corresponding to a respective last communicated content fragment, wherein the respective state of the buffer describes a respective duration of buffered content corresponding to at least one size and at least one encoding bit rate attribute for the respective last communicated content fragment transferred to the client device during the stream of content over time;

update a stream history to store the at least one encoding bit rate attribute and the at least one size for the respective last communicated content fragment transferred to the client device during the stream of content over time;

calculate an estimated bandwidth of a communications channel to the client device based at least in part on a correlation between the at least one encoding bit rate attribute and the at least one size stored in the stream history at the at least one computing device, and an effect on the respective state of the buffer of the client device during the stream over time;

select a sequentially next content fragment of the stream for the client device based at least in part on the estimated bandwidth of the client device and at least one fragment selection override rule associated with the client device;

communicate a manifest file to the client device, the manifest file including a single resource locator of a plurality of resource locators associated with the sequentially next content fragment of the stream for reference by the client device, the manifest file excluding a remainder of the plurality of resource locators based at least in part on a purchase history associated with a user of the client device; and update the stream history to store at least one encoding bit rate attribute and at least one size for the sequentially next content fragment.

7. The system of claim 6, wherein the at least one computing device is further configured to:

calculate a confidence value associated with the estimated bandwidth based on a standard deviation with reference to at least one previously estimated bandwidth; and select the sequentially next content fragment of the stream based at least further in part on the confidence value.

8. The system of claim 7, wherein the at least one computing device is further configured to calculate, as the confidence value, a standard deviation of a plurality of states of the buffer or a plurality of rates of change of the buffer.

9. The system of claim 6, wherein the at least one computing device is further configured to:

select the sequentially next content fragment of the stream as having a bit rate greater than a last selected bit rate for a previously requested content fragment of the stream responsive to a rate of increase of buffered data in the buffer of the client device meeting a first predefined threshold; and select the sequentially next content fragment of the stream as having a bit rate less than the last selected bit rate for the previously requested content fragment of the stream responsive to a rate of decrease of buffered data in the buffer of the client device meeting a second predefined threshold.

10. The system of claim 6, wherein the at least one computing device is further configured to modify a selection of the sequentially next content fragment of the stream according to at least one override rule corresponding to a device type of the client device.

11. The system of claim 10, wherein the at least one computing device is further configured to select the sequentially next content fragment of the stream as having a last selected bit rate.

12. The system of claim 10, wherein:
the sequentially next content fragment of the stream is associated with a first bit rate; and
the at least one computing device is further configured to reselect the sequentially next content fragment of the stream as having a bit rate different than the first bit rate.

13. The system of claim 6, wherein the sequentially next content fragment of the stream is selected as having a bit rate greater than the estimated bandwidth responsive to an estimated download time of the sequentially next content fragment of the stream being less than or equal to a sum of a first duration of the sequentially next content fragment of the stream and a second duration of at least a portion of buffered content.

14. The system of claim 6, wherein the sequentially next content fragment of the stream is selected according to a projected amount of content in the buffer of the client device.

15. The system of claim 6, the manifest file further excluding the remainder of the plurality of resource locators based at least in part on a user profile comprising a location attribute associated with the user of the client device.

16. A non-transitory computer-readable medium embodying computer-readable instructions that, when executed by at least one computing device, directs the at least one computing device to at least:
begin a stream of content fragments of a media item to a client device over time; and
during the stream of content fragments over time:
obtain, from the client device, a respective state of a buffer of the client device corresponding to a respective last requested content fragment, wherein the respective state of the buffer describes a respective duration of buffered content corresponding to at least one size and at least one encoding bit rate attribute for the respective last requested content fragment transferred to the client device during the stream of content over time;
update a stream history to store the at least one encoding bit rate attribute and the at least one size for the respective last requested content fragment transferred to the client device during the stream over time;
calculate an estimated bandwidth of a communications channel to the client device based at least in part on a correlation between the at least one encoding bit rate attribute and the at least one size stored in the stream history by the at least one computing device, and an effect on the respective state of the buffer of the client device during the stream over time;
select a sequentially next content fragment of the stream for the client device based at least in part on the estimated bandwidth of the client device;
communicate a manifest file to the client device, the manifest file including a single resource locator of a plurality of resource locators associated with the sequentially next content fragment of the stream for reference by the client device, the manifest file excluding a remainder of the plurality of resource locators based at least in part on a purchase history associated with a user of the client device; and
update the stream history to store at least one encoding bit rate attribute and at least one size for the sequentially next content fragment.

17. The non-transitory computer-readable medium of claim 16, wherein the at least one computing device is further configured to:
calculate a confidence value associated with the estimated bandwidth based on a standard deviation with reference to at least one previously estimated bandwidth; and
select the sequentially next content fragment of the stream based at least further in part on the confidence value.

18. The non-transitory computer-readable medium of claim 16, wherein the at least one computing device is further configured to:
select the sequentially next content fragment of the stream as having a bit rate greater than a last selected bit rate for a previously requested content fragment of the media item responsive to a rate of increase of buffered data in the buffer of the client device meeting a first predefined threshold; and
select the sequentially next content fragment of the stream as having a bit rate less than the last selected bit rate for the previously requested content fragment of the media item responsive to a rate of decrease of buffered data in the buffer of the client device meeting a second predefined threshold.

19. The non-transitory computer-readable medium of claim 16, the manifest file further excluding the remainder of the plurality of resource locators based at least in part on a user profile comprising a location attribute associated with the user of the client device.

* * * * *